1

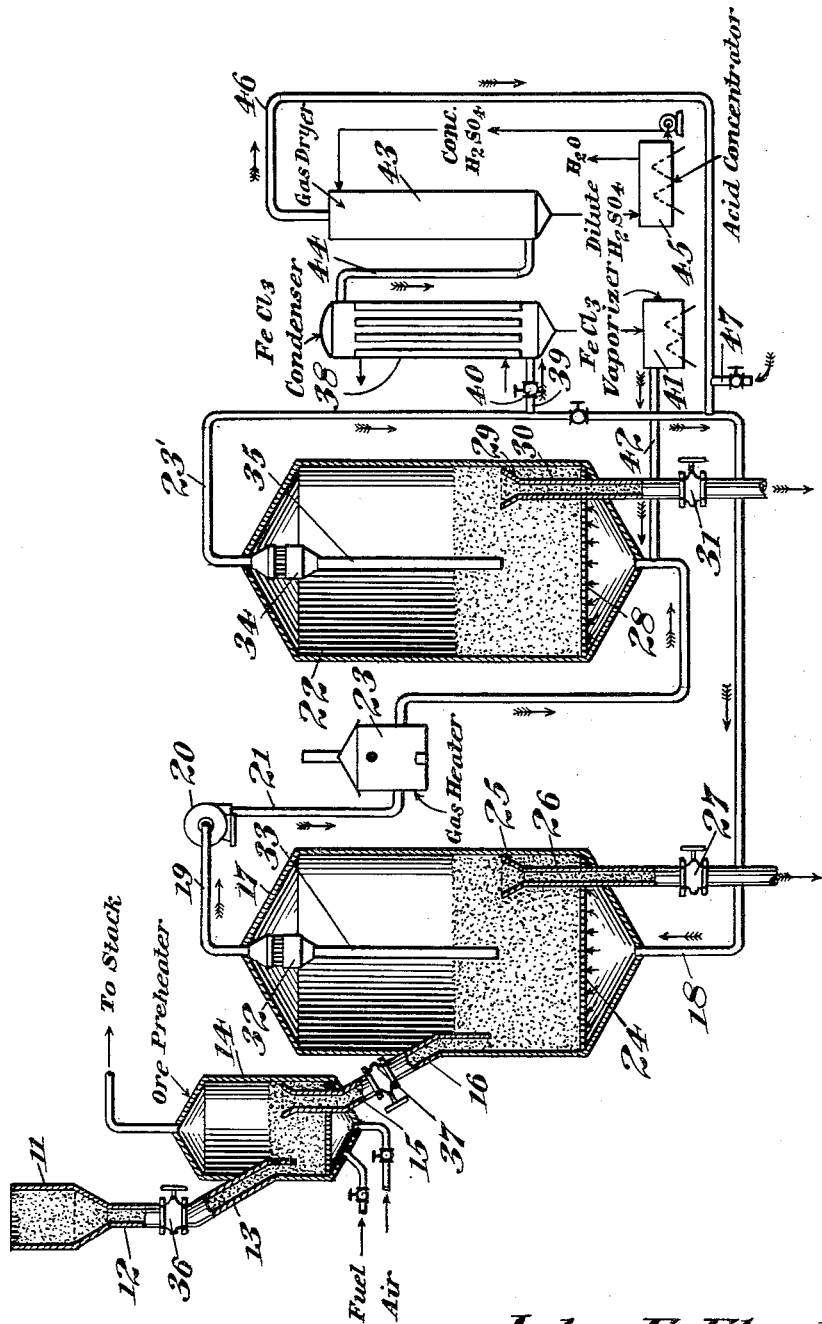

2,777,755

TREATMENT OF IRON BEARING MATERIAL

John E. Eberhardt, Bethlehem, Pa., assignor to Bethlehem Steel Company, a corporation of Pennsylvania Application August 8, 1952, Serial No. 303,209

12 Claims. (Cl. 23—200)

My invention is directed to processes for the treatment of materials containing iron and other constituents for the purpose of separting iron from other constituents. It is particularly directed to processes for the treatment of ores for the purpose of separating iron from the gangue and from non-ferrous metals.

The process of my invention comprises the steps of maintaining the temperature of the material being treated at least as high as the boiling point of ferric chloride, subjecting such heated material to the action of a gaseous chloridizing agent to form ferric chloride and either water vapor or oxygen or both, removing the gas from the vicinity of the material and elevating the temperature of the removed gas to form ferric oxide in the solid phase and either hydrochloric acid, chlorine or both in the gaseous phase. My invention utilizes the fact that the boiling point of ferric chloride is considerably lower than the boiling points of the chlorides of most of the non-ferrous metals which are commonly associated with iron in iron ores. The approximate boiling point of ferric chloride is 607° F. Following is a list of the approximate boiling points of the chlorides of certain non-ferrous metals found in various iron bearing ores:

| Compound: | Boiling point, ° F. |
|---|---|
| $CrCl_2$ | 2312 |
| $CrCl_3$ | 1760 |
| $NiCl_2$ | 1810 |
| $CoCl_2$ | 1920 |
| $MnCl_2$ | 2180 |

When, in my process, a material containing iron and one or more of the non-ferrous metals of the above list is heated to a temperature at least as high as the boiling point of ferric chloride but below the boiling point of the chloride of the non-ferrous metal having the lowest melting point of the chlorides of the non-ferrous metals present, and the heated material is subjected to the action of a chloridizing gas, ferric chloride is produced in the gaseous phase while the chlorides of the non-ferrous metals which are formed are mostly in the solid or liquid phase. During this chloridizing treatment an oxidizing gas is also formed, either water vapor or oxygen or a mixture of the two, depending upon whether the chloridizing gas is hydrochloric acid, chlorine or a mixture of hydrochloric acid and chlorine. The gas containing the ferric chloride and oxidizing gas is removed from the vicinity of the treated material and its temperature elevated which causes ferric oxide to be formed in the solid phase and hydrochloric acid gas or chlorine or a mixture of the two. The relatively low boiling point of ferric chloride is also important in removal of iron from the gangue of iron bearing ores.

My process is preferably continuous and recyclic. The gas passes continuously through the chloridizing zone, thence continuously to and through the zone for separation of ferric oxide and regeneration of chloridizing agent, and thence continuously from the latter zone to the chloridizing zone, and so on. The chloridizing gas employed is either chlorine or hydrochloric acid or a mixture of the two. I prefer that the chloridizing gas be predominantly hydrochloric acid but I also prefer that there be some chlorine present for reasons which will be set forth later in this specification.

I shall now describe examples of how my invention is put into practice. In my first example, I shall consider the treatment of a low grade iron ore to remove iron from the gangue. In this example, the ore is a Taconite ore which consists of about 30% to 35% iron in oxidic form and the balance substantially all silica.

Referring to the accompanying drawing, finely divided Taconite ore in bin 11 is fed through conduits 12 and 13 into the ore preheater 14. From this preheater the ore is fed through conduits 15 and 16 into the chloridizing chamber 17 where the ore is subjected to the action of a hot gas consisting predominantly of hydrochloric acid which enters the bottom of the chamber through pipe 18. The ore which enters this chloridizing chamber is preheated to such an extent and the temperature of the gas which enters this chamber is such that the ore in the chloridizing chamber is maintained at about 1100° F. Under these conditions ferric chloride and water are formed, volatilized, and commingled with the gas. The gas, containing ferric chloride and water vapors, is drawn from the top of the chloridizing chamber through pipe 19 by means of pump 20, the gas then passing through pipe 21 to the gas reaction chamber 22. On its passage through pipe 21 the gas is heated to 1500° F. by gas heater 23 through which the pipe 21 passes. The elevation of the temperature of the gas, containing the vapors of water and ferric chloride causes the formation of ferric oxide and hydrochloric acid. This reaction starts in pipe 21, at the location of the gas heater, but the principal amount of chemical change occurs in reaction chamber 22. The ferric oxide produced is in the solid phase and drops into the lower part of the reaction chamber 22. The hydrochloric acid produced is in the gaseous form and commingles with the rest of the gas in the chamber replenishing such gas to the extent of replacing the hydrochloric acid consumed in the chloridizing chamber. The gas is withdrawn from the top of the reaction chamber 22 and passes through pipe 23 which is continuous with pipe 18 and returned to chloridizing chamber 17.

Various elements of structure are shown to the right of the drawing which have connections with the gas circulating pipes 21 and 23', but since they have no utility in the practice of the present example of the invention their description will be deferred until other examples of the invention are described which involve the use of these elements of structure. In the present example the gas circulation is a closed circuit; the gas passing through the chloridizing chamber, through pipes to the heating and reaction chamber and through pipes back to the chloridizing chamber.

In bringing the chloridizing gas into intimate contact with the ore particles in the chloridizing chamber I proceed as follows: An orificed plate 24 extends across the chamber near its bottom. The chloridizing gas passes through the orifices of this plate and into the mass of ore. The size of the ore, the velocity of the gas through the ore, and the particle size of the ore are so correlated that all the particles of ore above the plate are kept in suspension. The velocity of the gas should not be great enough to blow any undue amount of ore dust from the chloridizing chamber and yet the velocity should be great enough so that the ore particles do not come to rest upon the surfaces of the perforated plate. With the operation thus controlled the ore particles are kept suspended and assume the character of a boiling liquid. This method of bringing gases and finely divided solids into intimate reaction relationships is not new with me but is an old and well established technique. Within the mass of suspended ore is a funnel 25 connected with conduit 26 through which the ore is continuously discharged from the chloridizing chamber, the rate of discharge being controllable by means of valve 27. A similar arrangement is employed in the reaction chamber 22. The perforated plate 28 is disposed across the chamber near the bottom thereof. The gas, introduced in the bottom of the chamber, passes upwardly through the perforations and keeps the bed of separated ferric oxide particles in a state of agitation and suspension, the same as with the treatment of ore particles in the chloridizing chamber. Disposed in the mass of ferric oxide particles is a funnel 29 which communicates with conduit 30 through which the ferric oxide is discharged from the reaction chamber, the rate of discharge being regulatable by means of valve 31.

Near the top of chloridizing chamber 17 there is a dust catcher 32 through which the gas passes from the chamber before it enters pipe 19, the separated dust particles being conveyed to the mass of ore particles by means of pipe 33. Similarly reaction chamber 22 is provided with a dust catcher 34 which removes dust from the gas before it passes into pipe 23'. Pipe 35 conveys the separated dust to the mass of ferric oxide in the lower part of the chamber.

Preferably the ore is fed continuously into the preheater and from the preheater into the chloridizing chamber, valves 36 and 37 being used to control the rate of feed.

The rate of feed of ore into and the rate of discharge of treated ore from the chloridizing chamber 17 are such that the average detention time of any particle of the ore in the chloridizing chamber is sufficient to enable the reduction of the iron content to the desired extent.

My next example of the employment of my invention is its application to the treatment of Mayari type ores. In Cuba, and in various other places there are very large deposits of these ores. These ores contain considerable contents of iron which should make them valuable in the manufacture of iron and steel but as yet these ores have not been utilized except for certain limited purposes, because of the fact that they contain nickel and certain other non-ferrous values which prevent these ores being directly used in the general manufacture of iron and steel. It is an object of my invention to treat Mayari type ores to separate iron from the gangue and the non-ferrous metals to obtain ferric oxide low in content of non-ferrous metals. It is also an object of my invention to render the non-ferrous values in such a condition that they may be easily separated from the gangue.

Mayari ores as they occur in nature contain considerable "free water" and also a substantial amount of "combined water." Analyses of the calcined ores vary considerably but in general they run within ranges approximately as follows:

|  |  | Percent |
| --- | --- | --- |
| Fe | 54 |  |
| Ni | 1.0 | 0.25 to 1.56 |
| Cr | 2.2 | 2.0 to 2.7 |
| Co | 0.15 | 0.05 to 0.35 |
| Mn | 0.5 | 0.24 to 1.76 |
| SiO$_2$ | 5.0 | 1.6 to 7.0 |
| Al$_2$O$_3$ | 10.0 | 6.0 to 14.0 |

In this table of analyses, the first column indicates the constituents of the ore; the second column indicates an average analysis; and the remainder of the table indicates the ranges. When, in this specification, I refer to Mayari type ores I mean those ores which, like the Mayari ores, have a high content of iron and contain nickel in a substantially lesser amount but still in an amount too great for general iron and steel making, and in which ores the nickel is difficult to reduce to the necessarily small amounts required for general iron and steel making.

The treatment which I give to these Mayari type ores is similar in many ways to the example given above for the treatment of Taconite ores. The finely divided calcined ore is preheated and fed continuously into the chloridizing chamber 17 where its temperature is maintained at about 1100° F. Gas, consisting predominantly of hydrochloric acid is fed through the chloridizing chamber to form ferric chloride and water. The gas containing the ferric chloride and water passes from the chloridizing chamber to the reaction chamber being heated to 1700° F. by the gas heater. In the reaction chamber ferric oxide is formed in the solid phase and thus separated from the gas and hydrochloric acid regenerated. The greater part of the gas then returns to the chloridizing chamber.

As thus far described, the process for treating Mayari type ores is identical with the process for treating Taconite ores described above. The character of the Mayari type ores, however, calls for certain departures in their treatment. As indicated above the Taconite ores are of comparatively simple composition, consisting mainly of ferric oxide and gangue. Mayari type ores, however, are considerably more complex. They not only contain ferric oxide and gangue but contain varying amounts of oxidic compounds of nickel, cobalt, chromium and manganese. It is the presence of appreciable quantities of these non-ferrous metals in the Mayari type ores which necessitates some discussion of differences in the chemistry of the treatment and differences in the procedure.

When subjecting the Taconite ores to the action of hydrochloric acid in the chloridizing chamber the only chloridizing reaction of importance is the formation of ferric chloride which reaction includes hte formation of water. When subjecting Mayari type ores, however, to the action of hydrochloric acid not only is ferric chloride formed but also chlorides of nickel, cobalt and manganese. Because the temperature of the ore is above the boiling point of ferric chloride this compound will be volatilized and will be carried out of the chloridizing chamber with the gas. But, because the temperature of the ore in the chloridizing chamber is well below the boiling points of the chlorides of nickel, cobalt, and manganese only exceedingly small amounts of the chlorides of these non-ferrous metals will be volatilized and by far the greater part will remain with the gangue.

When treating Taconite ores, as above described, the gas circuit constitutes a completely closed system. The hydrochloric acid gas containing the vapors of ferric chloride and water pass from the chloridizing chamber to the reaction chamber 22 where ferric oxide is formed and separated from the gas and hydrochloric acid is generated, the gas then returning to the chloridizing chamber and so on. In the Taconite process there is no loss of hydrochloric acid, theoretically at least, as the hydrochloric acid which is consumed in the chlorinating chamber is replaced by the reaction in the reaction chamber. There is no increase in the amount of water vapor in the system because to the extent that water is formed in the chloridizing chamber it is consumed in the reaction which takes place in the reaction chamber.

The same conditions do not prevail when using the process in the treatment of Mayari type ores. Chlorine is constantly being withdrawn from the system and oxygen is constantly being added. The chlorides of nickel, cobalt, chromium and manganese, not being volatilized, will remain with the gangue and are removed from the chlorinating chamber therewith. Accordingly, it is important when treating Mayari type ores to introduce additional hydrochloric acid to maintain the chloridizing reagent. Furthermore, if the completely closed gas circuit described above for the Taconite ore treatment, were to be used with Mayari type ores the content of water vapor in the gases would gradually build up to the point where the chloridizing gas would be so dilute as not to be practically effective. The reason for the increase in water content will be apparent. Nickel and cobalt, for example, react with hydrochloric acid in accordance with the following equations

and

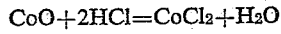

The other non-ferrous metallic oxides react similarly to form the chlorides and water. This water which is formed from the reaction of the non-ferrous metal oxides, in the chloridizing chamber, is in addition to the water formed during the chloridizing of ferric oxide. As pointed out above, the quantity of water formed in the chloridizing chamber, due to the chloridizing of ferric oxide is gotten rid of by the reverse reaction in the reaction chamber, but the quantity of water due to the chloridization of the non-ferrous metal oxides is not gotten rid of in the reaction chamber, in view of the fact that the non-ferrous metal chlorides are not volatilized and therefore do not enter reaction chamber 22 to take part in the reverse reaction to form hydrachloric acid and thereby get rid of the water. Therefore, the water content would continue to build up unless something were done to reduce its content.

Accordingly in treating Mayari type ores, I bleed off a portion of the gas which issues from reaction chamber 22 and remove water therefrom after which I return the gas to the circuit. Moreover, I add additional hydrochloric acid to the gas circuit to compensate for the loss of chlorine due to the formation of non-ferrous metal chlorides.

Referring to the drawing, I bleed off a portion of the gas from pipe 23', this bled off gas being conducted to ferric chloride condenser 38 by means of pipe 39, the amount of bleed-off being controllable by means of valve 40. This ferric chloride condenser 38 is for the purpose of removing ferric chloride from the bleed-off gas prior to the removal of water therefrom. The ferric chloride condenser 38 is not used at a temperature low enough to unduly reduce the temperature of the gas but it is operated at a temperature sufficiently below the boiling point of ferric chloride to rid the gas of any substantial amount of ferric chloride. The condensed ferric chloride is fed into a vaporizer 41 to vaporize it and the vapor is led back into the gas circuit through pipe 42 which connects with pipe 21. The gas from condenser 38 is fed to the lower part of drier 43 by means of pipe 44. Concentrated sulphuric acid is fed downwardly in drier 43 and the rising gas coming in contact with the acid loses its water to the acid. The somewhat diluted acid from the drier is received in an acid concentrator 45 from which concentrator the concentrated acid is returned for use in the drier 43. The dried gas from the top of drier 43 is fed by means of pipe 46 to pipe 23' and thus restored to the gas circuit. Additional hydrochloric acid is introduced into the gas circuit by means of pipe 47 which connects with pipe 46, this additional acid being sufficient in amount to compensate for the loss of chlorine due to the formation of non-ferrous chlorides in the chloridizing chamber.

The ferric oxide produced by this application of my process to Mayari type ores is very low in nickel or other non-ferrous contents and free from gangue and thus is an excellent material for the production of iron and steel. The treated ore from which iron has been removed, can easily be treated for the recovery of nickel, cobalt, chromium and manganese values. These non-ferrous metals are present as chlorides and therefore may be easily separated from the gangue by leaching with water, and the values in the resulting solution can be recovered by any of the well known methods.

In the two examples of my process thus far given, the gaseous chloridizing agent is predominantly hydrochloric acid. Chlorine may be used instead of hydrochloric acid to obtain good results but, in practice, I prefer the use of a gas which consists predominantly of hydrochloric acid as I find that the speed of reaction is considerably greater with hydrochloric acid than with chlorine.

While I find that hydrochloric acid is preferable to chlorine as the main chloridizing agent, I usually desire to use some chlorine with the hydrochloric acid. When hydrochloric acid gas alone is used not only is ferric chloride formed but also some ferrous chloride. This is a disadvantage as the formation of ferrous chloride prevents as effective a separation of iron from the other ore constituents as would be possible if only ferric chloride were formed. The reason for this will be apparent when one considers the relative boiling points of ferrous and ferric chlorides. While ferric chloride has the relatively low boiling point of about 607° F., ferrous chloride has the relatively high boiling point of about 1880° F. Now consider what would happen if one were treating iron ores containing nickel, for example, such as the Mayari type ores mentioned above, the chloridizing gas consisting solely of hydrochloric acid. The temperature for chloridizing would be not less than the boiling point of ferric chloride but it would be less than the boiling point of nickel chloride. Under these conditions the ferric chloride formed would be volatilized and removed from the ore but the ferrous chloride formed would remain with the nickel in the ore.

When hydrochloric acid is used alone, the amount of ferrous chloride formed is not nearly as great as the amount of ferric chloride, but usually I desire to inhibit the formation of substantial amounts of ferrous chloride. This I do by the use of some chlorine with the hydrochloric acid. In my preferred practice I employ hydrochloric acid in predominant amount but with enough chlorine to substantially inhibit the formation of ferrous chloride. The amount of chlorine to use with the hydrochloric acid will vary with varying conditions but usually the amount will be from 10% to 30% by volume of the chloridizing gas.

My process is very useful in the treatment of low grade manganese ores to obtain a product of high manganese concentration. As an example of my process applied to this class of ores, I shall describe it as used upon the ore known as "Mangan-Louise." Such an ore, having 8.8% manganese, 35.2% iron and the balance substantially gangue is treated as follows: The ore is charged into the chloridizer, and while maintained at a temperature of from 1100° F. to 1200° F., is subjected to the action of a gas consisting predominantly of hydrochloric acid but also containing about 20% by volume of chlorine. The gas is continuously circulated through the chloridizing chamber to the reaction chamber and back in the manner indicated for the previous examples. The temperature in the reaction chamber 22 is maintained at about 1800° F. The manner of manipulating the process is essentially the same as that indicated for the treatment of Mayari type ores, including the bleed-off of a certain portion of the gas issuing from the reaction chamber 22 for the purpose of removing some of the water vapor. It is also necessary in operating this process to introduce fresh hydrochloric acid to the gas circuit to compensate for the loss of chlorine consumed in the chloridizing chamber in the formation of manganese chloride.

The treated ore which is withdrawn from the chloridizing chamber 17 contains practically all the manganese of the ore in the form of maganese chloride. It will also contain the gangue constituents of the ore. Manganese chloride is easily separated from the treated ore by leaching with water. This solution, containing most of the manganese of the ore, and very little iron, may then be treated for the recovery of manganese by means of well known processes. Manganese is the most valuable constituent desired in this particular ore but the ferric oxide which is removed from reaction chamber 22 is a very desirable source for iron or steel making as it has a very high content of iron and is not contaminated by any substantial amounts of non-ferrous constituents.

The temperature of the material being treated in the chloridizing chamber may be varied considerably. It must be at least as high as the boiling point of ferric chloride. When my process is being used to separate iron from non-ferrous metals, as in the examples given above of treating low grade manganese ores and Mayari type ores, the temperature must be as high as the boiling points of the chlorides of the non-ferrous metals present in the material. Usually, I prefer to keep the temperature substantially below the boiling point of the non-ferrous metal chlorides, as, if the material in the chloridizing chamber is maintained at a temperature approaching too closely the boiling points of the non-ferrous metal chlorides, the vapor pressures of such chlorides become sufficiently high to cause an objectionably large amount of non-ferrous metal chlorides to be carried with the ferric chloride into the reaction chamber, with the consequence that the ferric oxide produced in the reaction chamber will be unduly contaminated with non-ferrous metal oxides. When treating Mayari type ore, as in one of the previous examples of my process, I usually employ a chloridizing temperature not widely departing from the range of from 1000° F. to 1200° F. Such a range of temperature is high enough above the boiling point of ferric chloride to effect a sufficiently rapid formation and volatilization of ferric chloride and such range of temperature is sufficiently below the boiling points of the non-ferrous metal chlorides so that the ferric oxide formed in the reaction chamber is not unduly contaminated by non-ferrous metal oxides.

The temperatures employed in the reaction chamber to form ferric oxide and hydrochloric acid gas may vary considerably. The lowest temperature employed in the reaction chamber must be one which is above the temperature employed in the chloridizing chamber. Ordinarily, if a temperature of from 1000° F. to 1200° F. is used in the chloridizing chamber I will use a temperature in the reaction chamber which is not less than 1400° F. In practice I use in the reaction chamber temperatures between 1400° F. and 1700° F. the most commonly used temperature being in the vicinity of 1500° F.

My process is applicable to the treatment of oxidic materials, i. e. materials containing oxides or compounds which during the chloridizing reaction react as do the oxides to form ferric chloride and an oxidizing gas. For the purpose of my process the silicates behave similarly to oxides. If the material to be treated is not oxidic, as, for example, a sulfide ore, it should be roasted to the oxide state before treatment by my process.

I claim:

1. A process for treating oxidic ore containing iron to separate iron from the gangue, comprising the steps of charging the ore into a chloridizing chamber, maintaining the ore at a temperature at least as high as the boiling point of ferric chloride, passing gas consisting predominantly of hydrochloric acid through the chloridzing chamber and in contact with the ore therein to produce a gaseous mixture containing ferric chloride and water vapor, elevating the temperature of this gaseous mixture after it has left the chloridizing chamber to form ferric oxide in the solid phase and hydrochloric acid gas and returning at least a portion of this latter gas to the chloridizing chamber.

2. A process for treating oxidic ore containing iron to separate iron from the gangue, comprising the steps of charging the ore in a chloridizing chamber, maintaining the ore at a temperature between the boiling point of ferric chloride and 1200° F., passing gas consisting predominantly of hydrochloric acid but also containing sufficient chlorine to substantially inhibit the formation of ferrous chloride through the chloridizing chamber and in contact with the ore therein to produce a gaseous mixture containing ferric chloride, oxygen and water vapor, elevating the temperature of this gaseous mixture at least 100° F. after it has left the chloridizing chamber to form ferric oxide in the solid phase and hydrochloric acid and chlorine in the gaseous phase and returning at least a portion of the latter gases to the chloridizing chamber.

3. A process for treating an oxidic material containing iron and a second metal, the chloride of which second metal has a boiling point substantially above the boiling point of ferric chloride, comprising the steps of maintaining the material at a temperature not less than the boiling point of ferric chloride but below the boiling point of the chloride of the second metal and below the temperature at which the ferric chloride would be converted into ferric oxide, treating such heated material with a gas consisting predominantly of hydrochloric acid to produce a gaseous mixture containing ferric chloride and water vapor, removing this gaseous mixture containing ferric chloride and water vapor from the vicinity of the treated material, elevating the temperature of this gaseous mixture to form ferric oxide in the solid phase and hydrochloric acid in the gaseous phase and returning at least a portion of this latter gas to the oxidic material.

4. A process for treating an oxidic material containing iron and a second metal, the chloride of which second metal has a boiling point substantially above the boiling point of ferric chloride, comprising the steps of charging the material into a chloridizing chamber, maintaining the material in the chloridizing chamber at a temperature between the boiling point of ferric chloride and the boiling point of the chloride of the second metal but not higher than 900° F., passing gas consisting predominantly of hydrochloric acid through the chloridizing chamber and in contact with the heated material therein to produce a gaseous mixture containing ferric chloride and water vapor, elevating the temperature of this gaseous mixture after it has left the chloridizing chamber at least 100° F. but not above 1650° F. to form ferric oxide in the solid phase and hydrochloric acid in the gaseous phase and returning at least a portion of this gas to the chloridizing chamber.

5. A process for treating an oxidic material containing iron and a second metal, the chloride of which second metal has a boiling point substantially above the boiling point of ferric chloride, comprising the steps of charging the material into a chloridizing chamber, maintaining the material in the chloridizing chamber at a temperature between the boiling point of ferric chloride and the boiling point of the chloride of the second metal but not higher than 1200° F., continuously passing gas consisting predominantly of hydrochloric acid through the chloridizing chamber and in contact with the heated material therein to produce a gaseous mixture containing ferric chloride and water vapor, elevating the temperature of this gaseous mixture after it has left the chloridizing chamber at least 100° F. to form ferric oxide in the solid phase and hydrochloric acid in the gaseous phase and continuously returning at least a portion of the latter gas to the chloridizing chamber.

6. A process for treating an oxidic material containing iron and a non-ferrous metal, the chloride of which non-ferrous metal has a boiling point substantially above the boiling point of ferric chloride, comprising the steps of continuously charging the material into a chloridizing chamber, maintaining the material in the chloridizing chamber at a temperature between the boiling point of ferric chloride and the boiling point of the chloride of the non-ferrous metal but not higher than 1200° F., continuously passing gas consisting predominantly of hydrochloric acid through the chloridizing chamber and in contact with the heated material therein to produce a gaseous mixture containing ferric chloride and water vapor, elevating the temperature of this gaseous mixture at least 100° F. after it has left the chloridizing chamber to form ferric oxide in the solid phase and hydrochloric acid in the gaseous phase and continuously returning at least a portion of the latter gas to the chloridizing chamber and continuously discharging treated material from said chloridizing chamber.

7. A process for treating an oxidic material containing iron and a second metal, the chloride of which second metal has a boiling point substantially above the boiling point of ferric chloride, comprising the steps of charging the material into a chloridizing chamber, maintaining the material in the chloridizing chamber at a temperature between the boiling point of ferric chloride and the boiling point of the chloride of the second metal but not higher than 1200° F., continuously passing gas consisting predominantly of hydrochloric acid but also containing sufficient chlorine to substantially inhibit the formation of ferrous chloride through the chloridizing chamber and in contact with the heated material therein to produce a gaseous mixture containing ferric chloride, water vapor and oxygen, elevating the temperature of this gaseous mixture at least 100° F. after it has left the chloridizing chamber to form ferric oxide in the solid phase and hydrochloric acid and chlorine in the gaseous phase and continuously returning at least a portion of the latter gases to the chloridizing chamber.

8. A process for treating an oxidic material containing iron and a non-ferrous metal, the chloride of which non-ferrous metal has a boiling point substantially above the boiling point of ferric chloride, comprising the steps of continuously charging the material into a chloridizing chamber, maintaining the material in the chloridizing chamber at a temperature between the boiling point of ferric chloride and the boiling point of the chloride of the non-ferrous metal but not higher than 1200° F., continuously passing gas consisting predominantly of hydrochloric acid but also containing sufficient chlorine to substantially inhibit the formation of ferrous chloride through the chloridizing chamber and in contact with the heated material therein to produce a gaseous mixture containing ferric chloride, water vapor and oxygen, elevating the temperature of this gaseous mixture at least 100° F. after it has left the chloridizing chamber to form ferric oxide in the solid phase and hydrochloric acid and chlorine in the gaseous phase and continuously returning at least a portion of the latter gases to the chloridizing chamber, and continuously discharging treated material from said chloridizing chamber.

9. A process for treating oxidic ore containing iron to separate iron from the gangue, comprising the steps of charging the ore into a chloridizing chamber, maintaining the ore at a temperature at least as high as the boiling point of ferric chloride but not over 1200° F., passing gas consisting predominantly of hydrochloric acid through the chloridizing chamber and in contact with the ore therein to produce a gaseous mixture containing ferric chloride and water vapor, elevating the temperature of this gaseous mixture at least 100° F. after it has left the chloridizing chamber to form ferric oxide in the solid phase and hydrochloric acid in the gaseous phase and returning at least a portion of the latter gas to the chloridizing chamber.

10. A process for treating an oxidic material containing iron and a non-ferrous metal, the chloride of which non-ferrous metal has a boiling point substantially above the boiling point of ferric chloride, comprising the steps of charging material into a chloridizing chamber, maintaining the material in the chloridizing chamber at a temperature at least as high as the boiling point of ferric chloride but below the boiling point of the chloride of the non-ferrous metal, continuously passing gas consisting predominantly of hydrochloric acid through the chloridizing chamber and in contact with the heated material therein to produce a gaseous mixture containing ferric chloride and water vapor, elevating the temperature of this gaseous mixture after it has left the chloridizing chamber to form ferric oxide in the solid phase and hydrochloric acid in the gaseous phase and returning at least a portion of the latter gas to the chloridizing chamber.

11. A process for treating Mayari type ore to separate iron therefrom, comprising the steps of charging the ore into a chloridizing chamber, maintaining the ore in the chloridizing chamber at a temperature not less than the boiling point of ferric chloride but below the boiling points of the chlorides of nickel, cobalt and manganese, passing gas consisting predominantly of hydrochloric acid through the chloridizing chamber and in contact with the heated ore therein to form chlorides of nickel, cobalt and manganese in the non-gaseous phase and to produce a gaseous mixture containing ferric chloride and water vapor, elevating the temperature of this gaseous mixture after it has left the chloridizing chamber to form ferric oxide in the solid phase and hydrochloric acid in the gaseous phase and returning at least a portion of the latter gas to the chloridizing chamber.

12. A process for treating low grade oxidic manganese ores containing iron to separate iron, comprising the steps of charging the ore into a chloridizing chamber, maintaining the ore in the chloridizing chamber at a temperature not less than the boiling point of ferric chloride but not as high as the boiling point of manganese chloride, passing gas consisting predominantly of hydrochloric acid through the chloridizing chamber and in contact with the heated ore therein to form manganese chloride in the solid phase and to produce a gaseous mixture containing ferric chloride and water vapor, elevating the temperature of this gaseous mixture after it has left the chloridizing chamber to form ferric oxide in the solid phase and hydrochloric acid in the gaseous phase and returning at least a portion of the latter gas to the chloridizing chamber.

References Cited in the file of this patent

UNITED STATES PATENTS

| Number | Name | Date |
|---|---|---|
| 1,552,786 | Westcott | Sept. 8, 1925 |
| 1,967,235 | Ferkel | July 24, 1934 |
| 1,992,685 | Westcott | Feb. 26, 1935 |
| 1,994,367 | Millar | Mar. 12, 1935 |
| 2,030,867 | Hart | Feb. 18, 1936 |
| 2,176,242 | Bowes | Oct. 17, 1939 |
| 2,291,206 | Bowes | July 28, 1942 |
| 2,436,870 | Murphree | Mar. 2, 1948 |
| 2,723,902 | Reeves et al. | Nov. 15, 1955 |